(12) United States Patent
Williams et al.

(10) Patent No.: US 12,517,366 B2
(45) Date of Patent: Jan. 6, 2026

(54) ELECTRONIC DEVICE

(71) Applicant: Apple Inc., Cupertino, CA (US)

(72) Inventors: Paul Williams, Seattle, WA (US); Alison B. Shutzberg, San Francisco, CA (US); Jonathan M. Anderson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/826,170

(22) Filed: Sep. 5, 2024

(65) Prior Publication Data

US 2025/0102816 A1 Mar. 27, 2025

Related U.S. Application Data

(60) Provisional application No. 63/585,555, filed on Sep. 26, 2023.

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G06F 1/1681* (2013.01)

(58) Field of Classification Search
CPC .... G02B 27/0176; G06F 1/163; G06F 1/1681
See application file for complete search history.

(56) References Cited

U.S. PATENT DOCUMENTS

| | | | | |
|---|---|---|---|---|
| 2021/0068277 A1* | 3/2021 | Mulliken | ........... | G02B 27/0179 |
| 2021/0103146 A1* | 4/2021 | Travers | .................... | G06F 3/016 |
| 2021/0255479 A1* | 8/2021 | Lopez | .................. | G02C 5/2254 |
| 2023/0288711 A1* | 9/2023 | Gallaher | ................ | G02C 11/06 |

\* cited by examiner

*Primary Examiner* — Robert J Michaud
(74) *Attorney, Agent, or Firm* — Dorsey & Whitney LLP

(57) ABSTRACT

A head-mountable device can include a display, an arm, a bi-stable hinge connecting the arm to the display, the bi-stable hinge and the arm including an open position, a folded position, and a splay position. A first electronic component can be positionally fixed between the display and the bi-stable hinge, a second electronic component can be positioned distal to the bi-stable hinge, and a cable can connect the first electronic component and the second electronic component, the cable being routed through the bi-stable hinge.

17 Claims, 10 Drawing Sheets

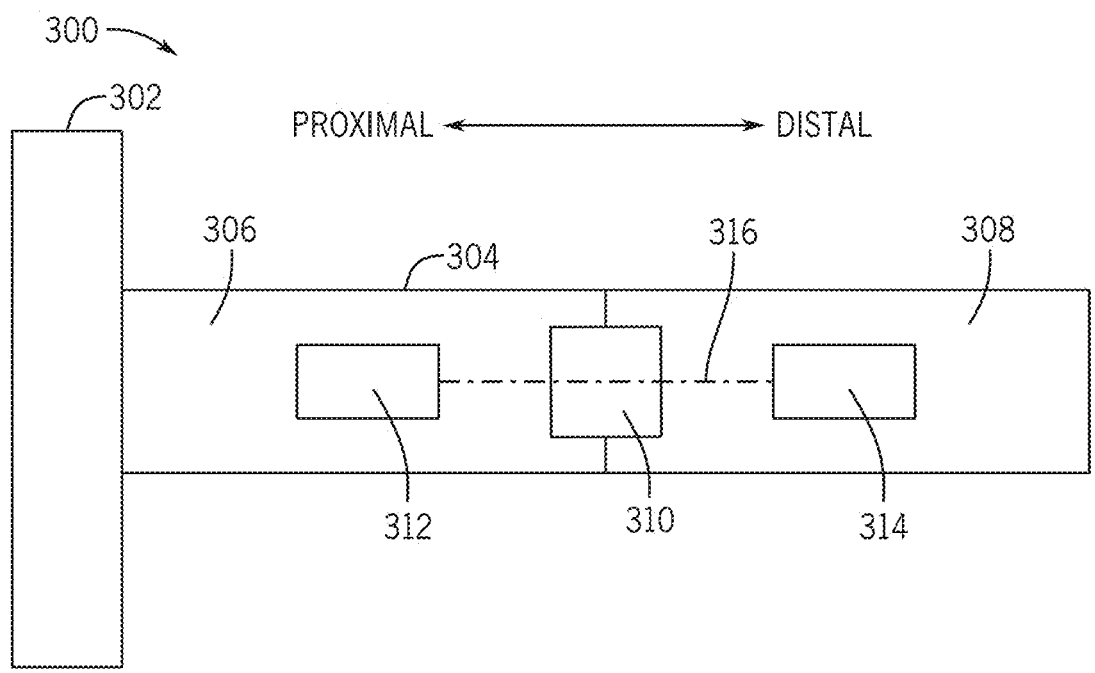
FIG. 3
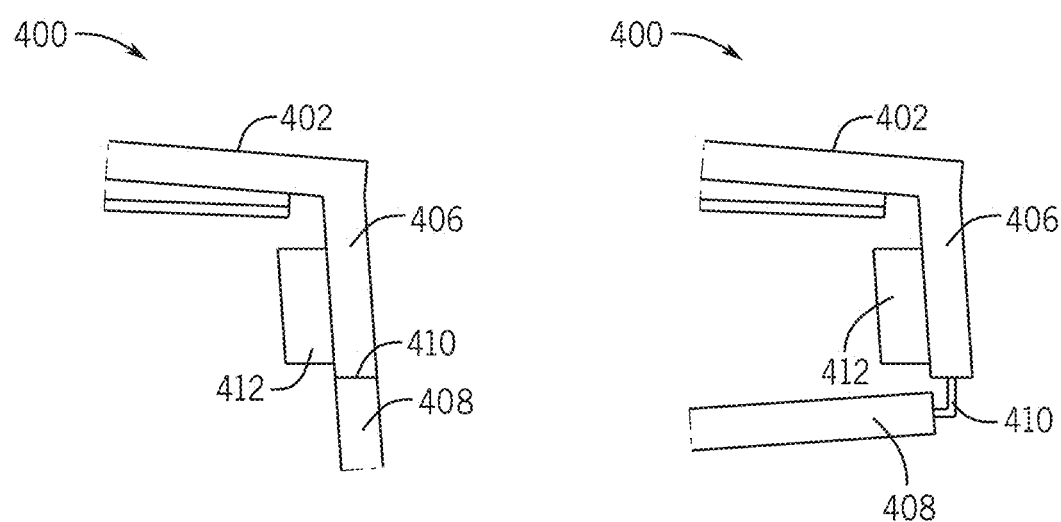
FIG. 4A  FIG. 4B

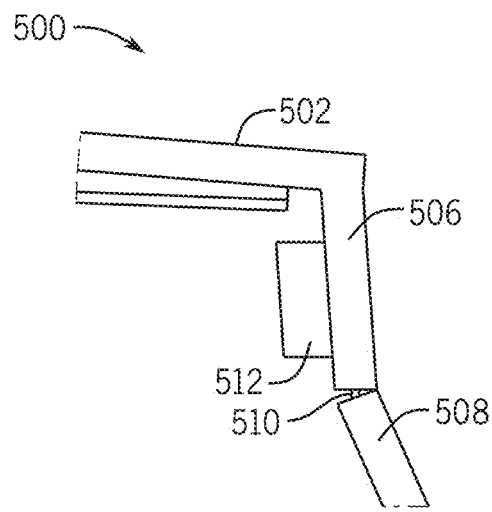
FIG. 5
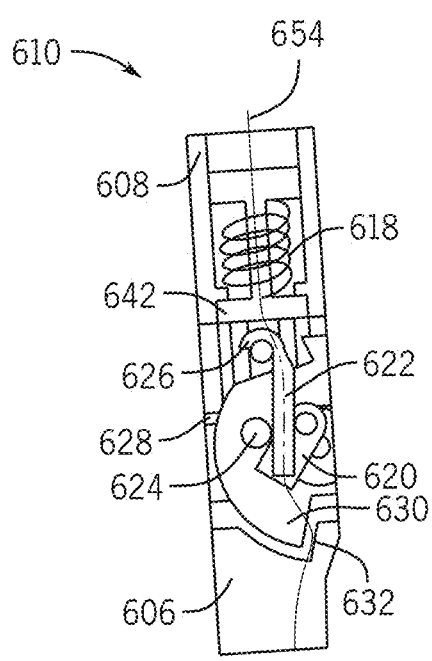 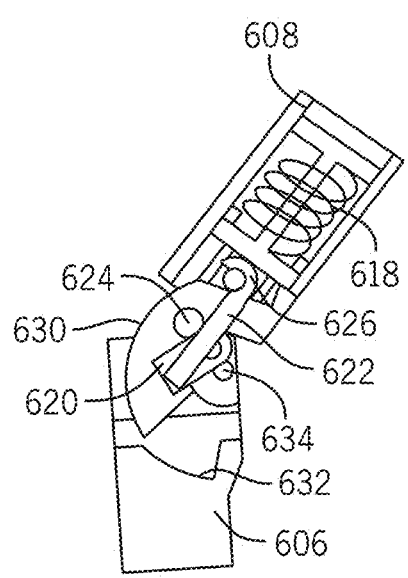
FIG. 6A      FIG. 6B

ELECTRONIC DEVICE

CROSS-REFERENCE TO RELATED APPLICATION

This application claims the benefit of U.S. Provisional Patent Application No. 63/585,555, filed 26 Sep. 2023, and entitled "ELECTRONIC DEVICE," the entire disclosure of which is hereby incorporated by reference.

FIELD

The described embodiments relate generally to electronic devices. More particularly, the present embodiments relate to head-mountable electronic devices.

BACKGROUND

Recent advances in portable computing have enabled head-mountable devices that provide augmented and virtual reality experiences to users. Various component of these devices, such as display windows, viewing frames, securement arms, speakers, batteries, and other components, operate together to provide an immersive and comfortable experience. However, the anatomy of each user's head is unique. One user's head can be larger than another or one head can be a different shape. Other anatomical features, including relative positions of a user's nose, forehead, and ears, can vary widely between users as well. The anatomical variety of heads presents a challenge for head-mountable devices designed for comfort and reliability.

In some head-mountable devices, for example, securement arms that extend along, or make contact with, opposing sides of a user's head can be used to secure the device to the user's head. However, the dimensions, angles, shape, and other physical characteristics of the arms that may be sufficient to comfortably and reliably secure the device to one user's head may not be sufficient to comfortably and reliably secure the device to another user's head.

Additionally, head-mountable devices can include electronics that should be protected from external environmental elements. Accordingly, what is needed in the art are head-mountable devices and systems that can improve conformability, flexibility, and/or user comfort, in addition to improved reliability and component protection.

SUMMARY

In at least one example of the present disclosure, a head-mountable electronic device can include a frame, a display window, an arm, a bi-stable hinge connecting the arm to the frame, the bi-stable hinge and the arm including an open position, a folded position, and a splay position. A first electronic component can be positionally fixed between the display window and the bi-stable hinge, a second electronic component can be positioned distal to the bi-stable hinge, and a cable can connect the first electronic component and the second electronic component through the bi-stable hinge.

In one example, the bi-stable hinge comprises a 4-bar linkage. In one example, the bi-stable hinge comprises multiple pivot points. In one example, the bi-stable hinge comprises a cover that conceals components of the bi-stable hinge during rotation of the arm from the open position to the folded position. In one example, the first electronic component comprises a projector. In one example, the arm defines a lateral protrusion and the projector is disposed within the lateral protrusion. In one example, the second electronic component comprises at least one of a battery or a printed circuit board.

In at least one example of the present disclosure, a hinge assembly for electronic glasses can include a distal end connectable with an arm, a proximal end connectable with a frame, a first pivot point positioned inside the hinge assembly between the distal end and the proximal end, the first pivot point having a first direction of rotation, and a second pivot point positioned exterior to the hinge assembly, the second pivot point having a second direction of rotation opposite the first direction of rotation.

In one example, the first direction of rotation corresponds to a folding direction. In one example, the second direction of rotation corresponds to a splay direction. In one example, the second pivot point is a virtual pivot point formed at an outer gap opening defined by exterior surfaces of the arm and the frame. In one example, the outer gap opening maintains a constant size during rotation of the hinge assembly in the second direction of rotation.

In at least one example of the present disclosure, a wearable apparatus can include a housing, a viewing window secured to the housing, a foldable arm connected to the housing, and a joint connecting the foldable arm and the housing. The joint can include a spring positioned axial with the foldable arm, a connecting link comprising a first end and a second end, the first end connected to the spring, a rotating link comprising a third end and a fourth end, the third end comprising a pivot point for the rotating link, and the fourth end being connected to the second end, and a follower in contact with the rotating link.

In one example, the wearable apparatus can further include a cable routed through the joint. In one example, the cable is routed through the connecting link. In one example, the foldable arm is movable between 80 and 100 degrees in a first direction, and between 5 degrees and 15 degrees in a second direction opposite the first direction. In one example, during a folding cycle of the foldable arm, the spring compresses during a first portion of the folding cycle, and the spring decompresses during a second portion of the folding cycle. In one example, the first end of the connecting link includes a hook attachable to the spring. In one example, an internal portion of at least one of the housing or the foldable arm is exposed prior to connecting the first end of the connecting link to the spring. In one example, the follower is translatable along a surface of the rotating link between the third end and the fourth end.

BRIEF DESCRIPTION OF THE DRAWINGS

The disclosure will be readily understood by the following detailed description in conjunction with the accompanying drawings, wherein like reference numerals designate like structural elements, and in which:

FIG. 3 shows a side view of an example of a head-mountable device;

FIG. 4A shows an example of a head-mountable device in a first state;

FIG. 4B shows an example of a head-mountable device in a second state;

FIG. 5 shows an example of a head-mountable device in a third state;

FIG. 6A shows a cross-sectional view of an example hinge of a head-mountable device in a first state;

FIG. 6B shows a cross-sectional view of an example hinge of a head-mountable device in a transitory state;

DETAILED DESCRIPTION

Figure 1:
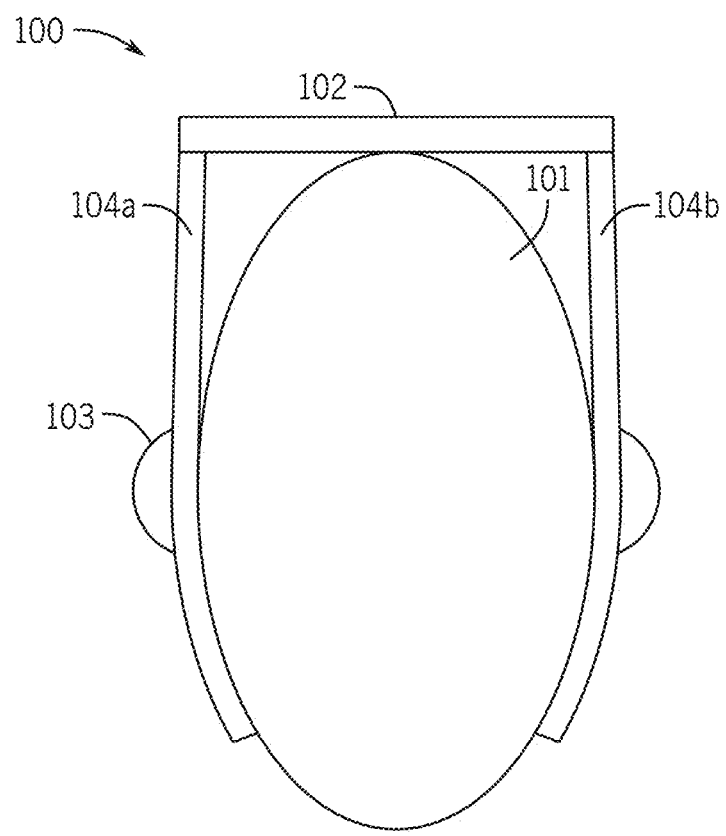
FIG. 1 shows a top view of an example of a head-mountable device worn by a user.

Detailed reference will now be made to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to electronic devices. More particularly, the present disclosure relates to head-mountable electronic devices. In at least one example, a head-mountable device can include a viewing frame and a securement arm extending from the viewing frame. Examples of head-mountable electronic devices can include virtual reality or augmented reality devices that include an optical component. In the case of augmented reality devices, optical eyeglasses or frames can be worn on the head of a user such that optical windows, which can include transparent windows, lenses, or displays, can be positioned in front of the user's eyes. In another example, a virtual reality device can be worn on the head of a user such that a display screen is positioned in front of the user's eyes. The viewing frame can include a housing or other structural components supporting the optical components, for example lenses or display windows, or various electronic components.

The optical electronic device can include one or more electronic components used to operate the head-mountable electronic device. These components can include any components used by the head-mountable electronic device to produce a virtual or augmented reality experience. For example, electronic components can include one or more projectors, waveguides, speakers, processors, batteries, circuitry components including wires and circuit boards, or any other electronic components used in the head-mountable device to deliver augmented or virtual reality visuals, sounds, and other outputs. The various electronic components can be disposed within the electronic component housing. In some examples, the various electronic components can be disposed with in or attached to one or more of the display frame, the electronic component housing, or the securement arm.

Examples of the present disclosure can include a securement arm extending from the viewing frame, including a bi-stable hinge. A head-mountable device (including an optical electronic device) can include two opposing securement arms that can apply pressure to or around a user's head to maintain the viewing frame resting on the user's nose and/or cheeks. In some examples, the securement arms can rest on top of the user's ears to assist in securing the head-mountable optical device to the head of the user. The bi-stable hinge can enable a portion of the securement arm to rotate about at least one pivot point in one direction. The hinge can allow the securement arm to fold inward toward the display when not in use. The ability to fold when not in use increases the usability, transportability, and durability of the head-mountable device. In some examples, a portion of the securement arm can rotate about a second pivot point in a direction opposite the first direction. This allows the securement arm to splay relative to the display frame. This can contribute to the robustness and comfort of the head-mountable device by accommodating different head sizes and head shapes.

The bi-stable hinge can bias the securement arm toward two stable positions. The stable positions can include an open and a folded position. This can provide the user with a certain tactile experience, while maintaining the integrity of the head-mountable device. The bi-stable hinge can include a 4-bar linkage in combination with a spring to achieve a biasing affect. The 4-bar linkage can be disposed within the hinge, and the hinge can include other components that affect the behavior of the 4-bar linkage. The spring can compress during one portion of the transition from the open position to the folded position and can decompress during another portion of the transition from the open position to the folded position. One or more of these aspects can work together to provide the user with a more comfortable and satisfactory experience.

In some examples, the hinge can be assembled using a one-time snap method. This allows the internal components of the hinge to be accessible during assembly, and inaccessible to the user once assembled. The hinge can also include one or more covers or flanges that protect the internal components of the hinge. Additionally or alternatively, the one or more covers or flanges can conceal the internal components of the hinge (e.g., from the view of a user). Such a configuration can greatly enhance the aesthetic qualities of the securement arm, namely by creating a streamlined and simple exterior. The securement arm can also include one or more covers or flanges that can protect the inner components of the hinge as well as any electronic components. The covers and flanges also contribute to the aesthetic properties of the securement arm, and therefore the head-mountable device.

In some embodiments, the securement arm can include a protrusion defined by and located on a lateral inside portion of the arm. The protrusion can provide space for a projector, other electrical components, or mechanical components of the hinge. Thus, the hinge can be spaced apart from the display frame to accommodate the protrusion. The securement arm can include multiple portions and one or more electronic components used to operate the head-mountable electronic device. In examples where the securement arm includes multiple portions, a first portion can include a first electronic device and a second portion can include a second electronic device. The first portion can be connected to a second portion at a hinge and the second portion can include a second electronic device. In at least one example, the first electronic device and the second electronic device can be electrically connected with an electrical connector extending through the hinge. The second portion can rotate relative to the first portion to adjust the angle of the second portion relative to the first portion. The electrical connector can extend through the hinge such that rotation of the second portion at the hinge does not affect the electrically connectivity of the first electrical component with the second electrical component via the electrical connector.

These and other embodiments are discussed below with reference to FIGS. 1-11. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a top view of an example of a head-mountable electronic device 100 worn on the head 101 of a user. The device 100 can include a display frame 102 configured to secure one or more optical lenses or display windows in front of the eyes of the user. As used herein, the terms "display frame," "frame," and "housing" can refer to a portion of a head-mountable device that contains a display or display window. As used herein, the term "display" or "display window" can refer to a lens, a cover glass, or another surface designed to display a projected image on a somewhat transparent surface, or any other component that presents visual media or information to a user. The device 100 can also include one or more securement arms 104a, 104b secured to the display frame 102 and extending distally toward the rear of the user's head 101. The securement arms 104a, 104b can apply opposing pressures to the sides of the user's head 101, as shown, to secure the device 100 to the user's head 101. The securement arms 104a, 104b can also rest on the user's ears 103 and can secure the device 100 via friction between the securement arms 104a, 104b and the head 101.

However, as noted above, the head 101 of the user can be a unique shape and size with certain anatomical structures and positional configurations that vary across a user base. For example, the head 101 can include a unique position of each ear 103 such that the angle of the arms 104a, 104b in relation to the housing 102 of the device 100 shown in FIG. 1 can differ for another user. In general, the arms 104a, 104b can contact the head such as to exert comfortable opposing pressures to the sides of the user's head that counteract forces pulling the viewing frame 102 proximally off the user's head 101. Such forces can arise, for example, from jostling and bumping during normal use of the device 100 or other events. Different head sizes or shapes can cause the angle between the arms 104a, 104b and the display frame to change, thereby affecting the force exerted on the user's head and therefor the performance and comfort of the head-mountable device 100.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2A:
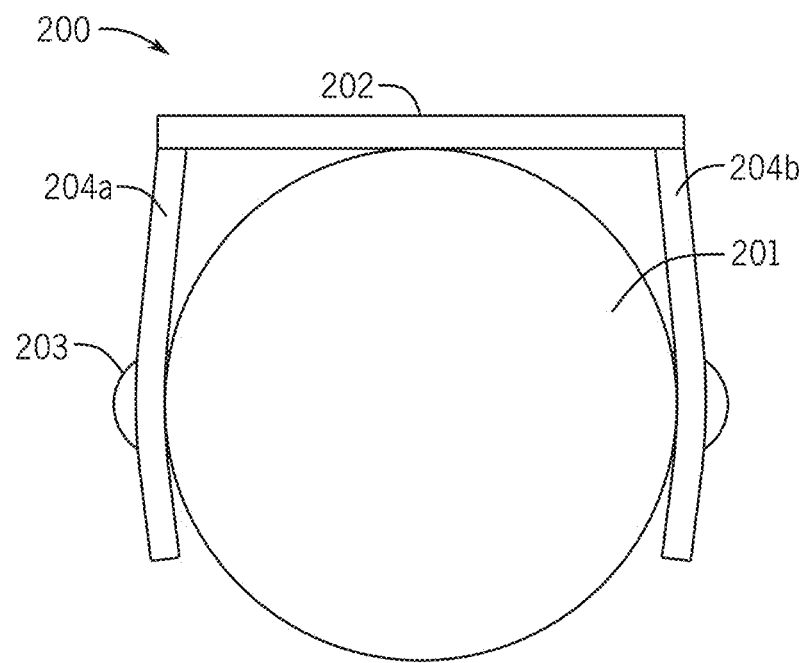
FIG. 2A shows a top view of an example of a head-mountable device worn by a user.
Figure 2B:
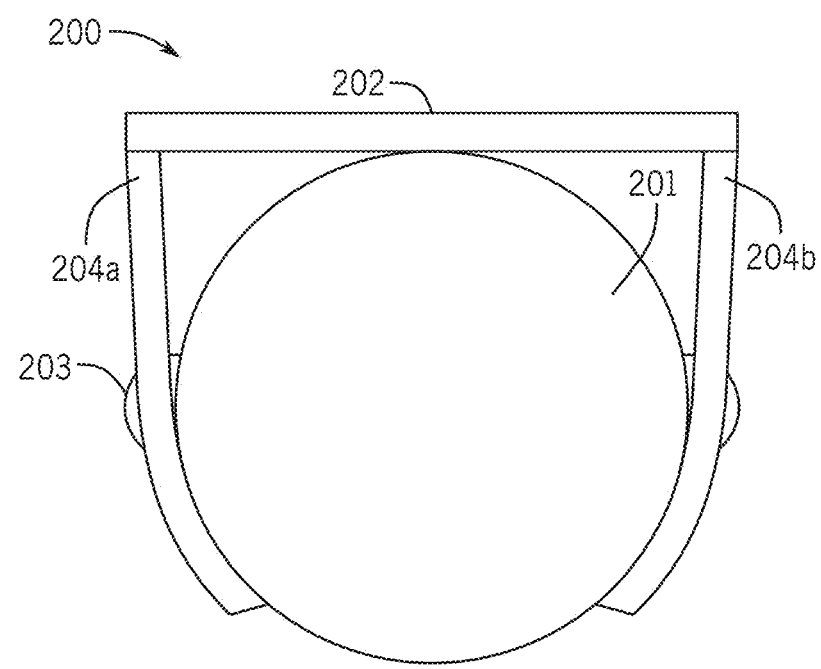
FIG. 2B shows a top view of an example of a head-mountable device worn by a user.

A user having a head 201 of a different size and shape as that of the head 101 shown in FIG. 1 is shown in FIG. 2. The same or similar head-mountable electronic device 200 can include a viewing frame 202 secured, at least in part, to the user's head 201 via one or more securement arms 204a, 204b. As show, the securement arms 204a, 204b can extend distally along opposing sides of the head 201. In the example shown, the arms 204a, 204b can extend over the user's ears 203 and toward the rear of the user's head 201. However, as shown in FIG. 2A, the shape of the user's head 201 can induce an angle between the arms 204a, 204b and the display frame 202 that is larger than the angle shown in FIG. 1. In other examples, as shown in FIG. 2B, the shape of the user's head 201 can induce an angle between the arms 204a, 204b and the display frame 202 that is smaller than the angle shown in FIG. 1. In at least one example, arms 204a, 204b can be configured to conform (to varying degrees) to the head 201 of a user while maintaining a comfortable and functional amount of opposing pressures on the user's head. For example, FIG. 2B shows the arms 204a, 204b maintain contact with the head 201 and at least partially curve with a curvature of the head 201 behind the ears 203. In contrast, the arms 204a, 204b in FIG. 2A maintain some separation relative to the head 201 as the arms proceed distal from the ears 203.

Any of the features, components, and/or parts, including the arrangements and configurations thereof shown in FIGS. 2A and 2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A and 2B. Further details of an exemplary electronic device are provided below with reference to FIG. 3

FIG. 3 shows a side view of an example of a head-mountable device 300, including a frame 302, and a securement arm 304 extending from the frame 302. As noted above, in some examples, the arm 304 can be hingedly or rotatably attached to the frame 302. In some examples, the arm 304 can be fixedly or unmovably attached or secured to the frame. In at least one example, the arm 304 can include a first portion 306 including a first electronic component 312 and a second portion 308 rotatably connected to the first portion 306 at a hinge 310. The second portion 308 can include a second electronic component 314. Additionally, at least one example can include an electronic circuitry component 316 extending through the hinge 310 and electrically connecting the first electronic component 312 and the second electronic component 314. As used herein, the terms "joint" and "hinge" can refer to a component or a set of components enabling one portion of the arm 304 to rotate or move relative to another portion. For example, via the hinge 310, the second portion 308 can rotate or move relative to the first portion 306. In some example, the first and second portions 306, 308 can be separate pieces such that the hinge 310 includes one or more components rotatably connecting both separate pieces. More details regarding various examples of hinges and hinge structures are given below with reference to other figures.

The first and second electronic components 312, 314 can include any number of electronic components configured to operate and produce a virtual or augmented reality experience to the user through the device 300. For example, the first electronic component 312 can include a projector, waveguides, speaker, processor, or memory component and the second electronic component 314 can include a battery or any other component, including those described with reference to the first electronic component 312. In examples where the second electronic component 314 includes a battery, the battery can be connected to the first electronic component 312 via the electronic circuitry component 316 to deliver power to the first electronic component 312.

In at least one example, the electronic circuitry component 316 can include one or more electrically conductive wires, flexes, resistors, circuit boards, or any other electronic circuitry components connecting the first electronic component 312 and the second electronic component 314. In at least one example, the arm 304 can include a housing defining an external surface and an interior volume. The first electronic component 312, the second electronic component 314, and/or the electronic circuitry component can be disposed within the internal volume such that the components are hidden from view. Alternatively, one or more of the components shown 312, 314, and 316 can be disposed on the housing (or at least partially exposed through the housing). The electronic circuitry component 316 can extend through the hinge 310 such that the functionality of the hinge 310 and the electronic circuitry component 316 is not hindered. More details regarding examples of the hinge 310 and electronic circuitry component 316 are given hereafter with reference to other figures.

In at least one example, the device 300 can include an optical device, and the first portion 306 of the arm 304 can be referred to as a proximal portion. In such an example, the second portion 308 of the arm 304 can be referred to as a distal portion. The terms "proximal" and "distal" can be used as relative terms (e.g., to reference the position of various components of devices described herein relative to the viewing frame 302 of the device 300). The orientation of the "proximal" and "distal" directions relative to devices described herein is shown in FIG. 3.

In some examples, the electronic circuitry component 316 can extend from the proximal portion 306 to the distal portion 308 through the hinge 310. In such an example, the electronic circuitry component 316 remains protected within an internal volume of the arm 304 within the proximal portion 306, distal portion 308, and the hinge 310. In at least one example, the distal portion 308 is rotatable relative to the proximal portion 306 at the joint 310 such that an angle between the proximal portion 306 and the distal portion 308 is variable. In this way, in at least one example, a user can rotate the distal portion 308 relative to the proximal portion 306 to alter an overall angle of the arm 304 relative to the position shown in FIG. 1 and FIG. 2. For example, the user can fold the distal portion 308 to be approximately perpendicular relative to the proximal portion 306 for storage.

In at least one example, the joint 310 can include a biasing member disposed between the distal portion 308 and the proximal portion 306. The biasing member can include any number of mechanisms, including springs and/or elastic materials, so that the position of the distal portion 308 can be elastically manipulated relative to the proximal portion 306 without permanently affecting the angle and position of the arm 304 and portions 306, 308 thereof. For example, the user can elastically expand the distance between opposing arms 304 of the device 300 while donning and/or doffing the device (or when otherwise handling or using the device 300) without plastically changing the relative position and angle between the proximal and distal portions 306, 308.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3. Further examples of an electronic device including hinges capable of various positions are discussed below in relation to FIGS. 4A-4B.

FIG. 4A shows an example of a portion of a head-mountable device 400 in a first state, including a display frame 402, a proximal portion 406, a distal portion 408, and a hinge 410. The first state shown in FIG. 4A can also be referred to as the "open position." In the open position, the proximal portion 406 and the distal portion 408 are substantially parallel to one another, allowing the user to don and doff the head-mountable device 400. In some embodiments, the proximal portion 406 can be longer than the corresponding portion of conventional head-mountable devices or glasses. This increases the distance between the display frame 402 and the hinge 410. The increased space in some cases can accommodate an electrical component 412, such as the first electrical component 312 described in FIG. 3. The electrical component 412 can be positioned within the volume defined by the proximal portion 406, partially disposed within the volume defined by the proximal portion 406, or on the surface of the proximal portion 406, on either the internal or external side of the proximal portion 406 relative to a user. Specifically, the electronic component can be a projector. Projectors can include one or more components that output a graphical representation or image via a projection (e.g., a digital image cast or otherwise transmitted from the projector to a display medium). If the projector is too close, the image can be undesirably small. By contrast, if the projector is too far, the image can be distorted or lose image quality. Thus, the space between the display frame 402 and the hinge 410 can facilitate a desirable image size, quality, or other property to provide the user with a satisfactory experience.

FIG. 4B shows an example of a head-mountable device 400 in a second state, including the same or similar components shown in FIG. 4A. The second state can also be referred to as the "folded position." In the folded position, the distal portion 408 can form an angle relative to the proximal portion. In some embodiments, the angle formed between the proximal portion and the distal portion can be between 80 and 100 degrees. The folded position of the distal portion 408 can contribute to the portability of the head-mountable device 400. For example, the folded position of the head-mountable device 400 decreases the footprint of the device, making it more convenient to carry, pack, store, and transport. The folded position of the head-mountable device 400 can also contribute to the robustness of the device. When the distal portion 408 is in the open position, the distal portion can snag or catch on foreign objects. When in the open position, the distal portion 408 is also more exposed to outside forces or torques due to dropping, storing, or transporting in comparison with the folded position. Therefore, the folded position of the distal portion 408 can prevent damage to the head-mountable device 400.

In some embodiments, the hinge 410 can be a bi-stable hinge. As used herein, the term "bi-stable hinge" refers to a hinge that is biased to have two stable positions. A stable position can refer to a position which the hinge will hold when subject to typical gravitational forces when handling or moving the head-mountable device 400, independent of orientation. The hinge can be biased using linear springs, torsional springs, tensional members, material properties, component geometries, magnets, or any combination thereof (including methods or components not specified herein). For example, a bi-stable hinge can return to one stable position when displaced up to a specified angle and can snap to a second position when displaced past the specified angle. A bi-stable hinge such as hinge 410 can maintain the state of the distal portion 408 desired by the user. For example, the bi-stable hinge 410 can prevent the distal portion 408 from entering the open position when in storage or transport. The bi-stable hinge 410 can also prevent the distal portion 408 from entering the folded position, thus making the device readily available for use by a user. The bi-stable hinge 410 can also improve the tactile properties of the head mountable device 400.

Any of the features, components, and/or parts, including the arrangements and configurations thereof shown in FIGS. 4A and 4B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A and 4B. Examples of a head-mountable device in a third state are provided below with reference to FIG. 5.

FIG. 5 shows an example of a head-mountable device 500 in a third state, including a display frame 502, a proximal portion 506, a distal portion 508, and a hinge 510. The third state can also be referred to as the "splay position." As used herein, the terms "splay," "splay action," and "splay position" refer to the displacement of the distal portion 508 in the opposite direction of the folded position describe in FIG. 4B. In some embodiments, the distal portion 508 can be displaceable between about 5 degrees and about 15 degrees relative to the proximal portion in a direction opposite that of the folded position. Other example ranges of displacement are also herein contemplated. For example, the distal portion 508 can be displaceable between about 0 degrees and about 5 degrees, 15 degrees and 25 degrees, 25 and 35 degrees, 35 and 45 degrees, or anther range of degrees not mentioned herein, relative to the proximal portion in a direction opposite that of the folded position.

The head mountable device 500 can also include an electronic component 512 positioned within the volume defined by the proximal portion 506, partially disposed within the volume defined by the proximal portion 506, or on the surface of the proximal portion 506. In some cases, the electronic component 512 can comprise a projector and/or waveguides. The splay position can allow the head-mountable device 500 to accommodate different head sizes or shapes by changing the angle between the proximal portion 506 and the distal portion 508, thereby affecting the force exerted on the user's head and therefore the performance and comfort of the head-mountable device 500.

The splay position can also contribute to the robustness of the head-mountable device 500 by allowing the distal portion 508 to displace in response to an outside force. When a force is exerted on the distal portion 508 such as a drop event or force exerted by a user, the bi-stable nature of the hinge 510 can absorb the energy exerted on the distal portion 508, thereby preventing the head mountable device 500 from breaking or at least reducing an amount of damage to the head-mountable device 500. In some cases, the distal portion 508 can also displace a sufficient amount for the acting foreign object to cease exerting a force on the distal portion 508. For example, if the distal portion 508 snags on the clothing of a user, the displacement of the distal portion 508 in the splay position of the hinge 510 can allow the distal portion 508 to slip past the clothing, whereas a hinge lacking structure to position to a splay state might overextend, become damaged, or break under similar circumstances. The splay action of the hinge 510 can also increase the comfort of the head-mountable device 500 when donned or doffed by a user. The distal portion 508 can displace during donning or doffing process such as to decrease the force exerted on a part of the head of a user and return to the open position when fully donned or doffed, providing sufficient force to secure the head-mountable device 500 to the head of the user.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5. Examples of the internal workings, components, and attachments of a head-mountable device are further discussed with reference to FIGS. 6A-6C below.

FIG. 6A shows a cross-sectional view of an example hinge 610 of a head-mountable device in an open position, including a spring 618, a rotating link 620, a connecting link 622, and a follower 624. In at least one example, the hinge 610 is a bi-stable hinge. The open position shown in FIG. 6A can be one of the two stable positions of the bi-stable hinge 610. The connecting link can include a hook 626 at one distal end. The rotating link 620 can be connected to a proximal portion 606, and the connecting link 622 can be connected to the spring 618 via the hook 626. The hook 626 can be connected to a distal end of the spring 618 either directly or via an intermediate component 642. As used herein, the terms "rotating link" and "connecting link" refer to mechanical components of a hinge. The rotating link 620 and the connecting link 622 are separate and distinct, although they can both rotate, experience forces, and facilitate motion of the hinge 610. In some embodiments, the proximal portion 606, distal portion 608, rotating link 620, and the connecting link 622 can comprise a 4-bar linkage. The term "follower," as used herein, refers to a pin, protrusion, or other structure that restricts the motion of the rotating link 620, the connecting link 622, or both. In some embodiments, the spring 618 is axially disposed within the distal portion 608.

In the open position, the rotating link 620 and the connecting link 622 are configured such that the spring 618 is in a decompressed or unbiased state. The rotating link 620 and the connecting link 622 can be configured to form an angle between 0 and 90 degrees at any point throughout the range of motion of the hinge 610. A larger angle formed by the rotating link 620 and the connecting link 622 increases the overall effective length of the system of links 620, 622. Conversely, a smaller angle formed between the rotating link 620 and the connecting link 622 decreases the effective length of the system of links 620, 622. As used herein, the term "effective length" refers to the distance between the acting points in a system, not the total length of each component in a system. For example, the effective length can refer to the distance between the connection of the rotating link 620 and the proximal portion 606, and the connection between the connecting link 622 and the distal portion 608. The follower 624 can restrict the position of the rotating link 620 and the connecting link 622 to produce a desired angle or path of motion. In the open position, the follower 624 can prevent the rotating link 620 and the connecting link 622 from rotating in a fashion that affects the length of the spring 618.

In some examples, the connecting link 622 can include a bend such that it affects the over-center angle of the bi-stable hinge 610. As used herein, the term "over-center angle" refers to the angle at which the force biasing the hinge toward the open position and the force biasing the hinge toward the folded position are equal. In other words, the over-center angle is the point at which the overall bias of the hinge changes from toward the open position to toward the folded position or vice versa. In some embodiments, the over-center angle can be at 45 degrees. An over-center angle of 45 degrees can facilitate a satisfactory tactile experience, where opening and closing the hinge feels balanced, controlled, smooth, tight, and solid (e.g., devoid of slop). In other embodiments, the connecting link 622 can be configured to produce an over-center angle other than 45 degrees. This can be done for a myriad of reasons, including but not limited to changing or improving the tactile experience of the user, protecting the device in a drop scenario, preventing the arms from colliding with the lenses when closing, and/or changing the amount of pressure exerted on the head of a user in the open position.

In some embodiments, the proximal portion 606 and the distal portion 608 can form or define an outer gap 628. The outer gap 628 can reduce the chance of pinching a user or foreign object by not allowing the proximal portion 606 and the distal portion to abut one another at the outer gap 628. The outer gap 628 can also prevent the material of either the proximal portion 606 or the distal portion 608 from buckling or breaking if abutment were possible. The outer gap 628 can also improve the aesthetic properties of the hinge 610 by providing a user with evidence of high build quality and quality control. The distal portion can also include a cover 630. The cover 630 can prevent dirt, dust, or other contaminants from entering the hinge 610. In the open position, the cover 630 can specifically prevent contaminants from entering the hinge 610 through the outer gap 628. In some examples, the proximal portion 606 can include or define an internal cutout 632 configured to receive the cover 630. The internal cutout 632 can allow the proximal portion 606 to obstruct the cover 630 from the view of a user, thereby helping to improve the aesthetic properties of the hinge 610 in some examples.

In some embodiments, electrically conductive cables, flexes, or other electronic components 654 can be routed through the hinge 610. In some examples, the electrically conductive cables, flexes, or other electronic components 654 can be routed through the connecting link 622 (e.g., as shown in FIG. 6A). In other examples, the electrically conductive cables, flexes, or other electronic components 654 can be routed through the space formed between the cover 630 and the follower 624. The electrically conductive cables, flexes, or other electronic components 654 can connect the first electronic component 312 and the second electronic component 314 described in FIG. 3.

FIG. 6B shows a cross-sectional view of an example hinge 610 of a head-mountable device in a transitory state. The transitory state can occur during the folding cycle of the hinge 610. As used herein, the "folding cycle" of the hinge 610 refers to the process of the hinge 610 transitioning from the open position to the folded position. In the transitory state, the hinge 610 can rotate about a first pivot point 634 in a first direction. In some examples, the follower 624 restricts the movement of the rotating link 620 and the connecting link 622 such that the angle formed by the rotating link 620 and the connecting link 622 is smaller than the angle between the rotating link 620 and the connecting link 622 in the open position. This can shorten the effective length of the system of links 620, 622, and can cause the spring 618 to compress. The compressed spring 618 can bias the hinge 610 into one of two stable positions (i.e., the open position or the closed position) by exerting a pressure or force on the connecting link 622. Accordingly, in some embodiments, the spring 618 can compress during a first portion of the folding cycle (i.e., when the angle formed between the proximal portion and the distal portion is less than about 45 degrees) and decompress during a second portion of the folding cycle (i.e., when the angle formed between the proximal portion and the distal portion is greater than about 45 degrees).

In some examples, the cover 630 can protect the internal components of the hinge 610 when in the transitory state. In addition to protecting the hinge 610 from contaminants, the cover 630 can also protect the hinge components from larger foreign objects that can damage the hinge 610. In this manner, the cover 630 can contribute to the longevity and robustness of the hinge 610. The cover 630 can also be partially concealed by the proximal portion 606 in the transitory state.

Figure 6C:
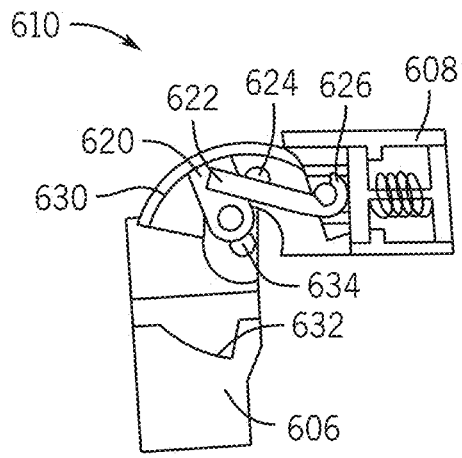
FIG. 6C shows a cross-sectional view of an example hinge of a head-mountable device in a second state.

FIG. 6C shows a cross-sectional view of an example hinge 610 of a head-mountable device in a folded position. The folded position shown in FIG. 6C can be one of the two stable positions of the bi-stable hinge 610. In the folded position, the effective length of the system of links 620, 622 can be longer than the effective length of the system of links 620, 622 shown in FIG. 6B. In the folded position, the links 620, 622 can be configured such that the spring 618 is in a decompressed or unbiased state. In some embodiments, the spring 618 can be attached to the system by the connecting link 622. The cover 630 can protect the components of hinge 610 as described in FIGS. 6A-6B. In some embodiments, the cover 630 can be partially hidden within the proximal portion 606 when in the closed state. This can prevent contaminants or foreign objects from entering or damaging the hinge 610 even when in the closed state. This also contributes to the aesthetic properties of the hinge 610 as described in FIG. 6B.

Any of the features, components, and/or parts, including the arrangements and configurations thereof shown in FIGS. 6A-6C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6C. Examples of the internal workings, components, and attachments of head-mountable device in a third state are provided below with reference to FIG. 7.

Figure 7:
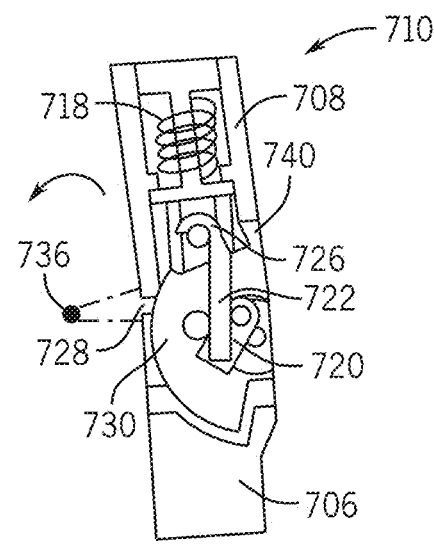
FIG. 7 shows a cross-sectional view of an example hinge of a head-mountable device in a third state.

FIG. 7 shows a cross-sectional view of an example hinge 710 of a head-mountable device similar to the hinge 610 of FIGS. 6A-6C, but in a splay position. The hinge 710 can include a proximal portion 706, a distal portion 708, spring 718, a rotating link 720, a connecting link 722, and a follower 724. In at least one example, the hinge 710 is a bi-stable hinge. The connecting link can include a hook 726 at one distal end. The rotating link 720 can be connected to a proximal portion 706, and the connecting link 722 can be connected to a distal end of the spring 718 via the hook 726. The hook 726 can be connected to the spring 718 either directly or via an intermediate component. In some embodiments, the spring 718 is axially disposed within the distal portion 708.

In the splay position, the distal portion 708 rotates relative to the proximal portion 706 about a second pivot point 736 in a second direction of rotation opposite the first direction of rotation. In some embodiments, the pivot point 736 can be a virtual pivot point. As used herein, the term "virtual pivot point" refers to a point or axis about which a hinge rotates that is located in free space. In other words, the virtual pivot point is not located within the object that rotates about the virtual pivot point. In some examples, the proximal portion 706 and the distal portion 708 can form an outer gap 728. The pivot point 736 can be located at or near the outer gap 728. The outer gap 728 can be the same or approximately the same size in the splay position as the outer gap 628 of FIG. 6A in the open position. The constant size of the outer gap 728 in both the splay position and the open position shown in FIG. 6A can contribute to the aesthetic properties of the hinge 710 by maintaining a constant outer appearance when the hinge is in different positions. The constant outer appearance of the hinge 710 can provide a user with evidence of high build quality, quality control, and design-oriented engineering.

In some embodiments, the splay position is facilitated by the rotating link 720, the connecting link 722, the follower 724, and the spring 718. For example, when the hinge 710 is rotated about the virtual pivot point 736, the follower 724 exerts a force on the rotating link 720 and the connecting link 722 that causes the angle formed by the rotating link 720 and the connecting link 722 to decrease relative to the corresponding angle formed in the open position shown in FIG. 6A. This decreases the effective length of the system of links 720, 722, thus compressing the spring 718. In turn, compressing the spring 718 biases the hinge 710 toward the open position shown in FIG. 6A. The distal portion 708 can also include a cover 730. The cover 730 can include a flange 740. The flange 740 can protect the components of the hinge 710 when in the splay position, as well as obstruct the components of hinge 710 from the view of a user. The distal portion 708 can be configured to receive the flange 740 when not in the splay position.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7. Methods of example hinge assembly and attachment are provided below in reference to FIGS. 8A-8B.

Figure 8A:
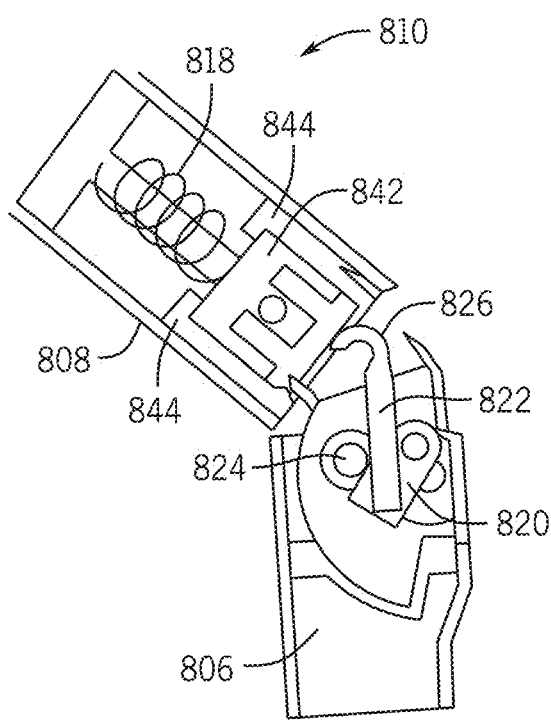
FIG. 8A shows a cross-sectional view of an example hinge of a head-mountable device before assembly.

FIG. 8A shows a cross-sectional view of an example hinge 810 of a head-mountable device during assembly, including a proximal portion 806, a distal portion 808, a spring 818, a rotating link 820, a connecting link 822, and a follower 824. The connecting link 822 can include a hook 826 at one distal end. Before assembly is complete, the internal components of the hinge 810 can be visibly exposed. This allows for the insertion of various mechanical components, assembly of the mechanical components, or inspection of the mechanical components of the hinge 810. This also allows for the insertion of electronic components, connection of electronic components, or routing of electronic components such as cables or flexes through the hinge 810.

In some embodiments, the distal portion can include an intermediate component 842 connected to the spring 818. The intermediate component 842 can include a pin, a bar, or another structure designed to receive the hook 826 via a one-time snap function. As used herein, the term "one-time snap" refers to a process in which a component is configured to receive the geometry of another component only once, being connected to one another thereafter barring difficult or destructive separation, or specially designed manufacturer tools. An example of a one-time snap function can be a plastic piece designed to deform around another component during the receiving process, then return to the original shape once received. The geometry of the plastic piece after being received can prevent separation of the two parts. The intermediate component 842 can also abut retaining portion 844 of the distal portion 808. The retaining portion 844 can be a cylindrical piece, one or more radial protrusions, or any other geometry. The retaining portion 844 can prevent the intermediate component 842 from translating axially toward the spring 818. This can allow the spring to be in tension even in the stable open and folded positions (shown in FIGS. 6A and 6C), which creates a stronger bias toward the stable positions of the hinge 810.

Figure 8B:
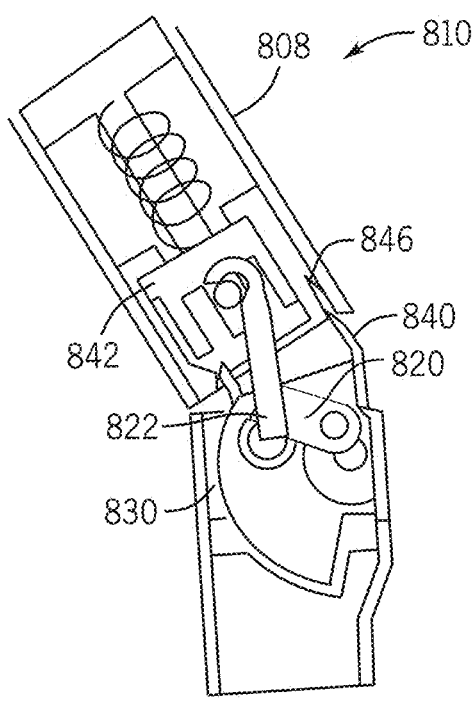
FIG. 8B shows a cross-sectional view of an example hinge of a head-mountable device after assembly.

FIG. 8B shows a cross-sectional view of an example hinge 810 of a head-mountable device after assembly. After assembly, the hook 826 of the connecting link 822 is attached to the intermediate component 842. In some embodiments, the proximal portion can include a cover 830. The cover 830 can include a flange 840. The distal portion 808 can include a cutout 846 configured to receive the flange 840. After assembly, the flange 840 can be received by the cutout 846 to protect the inner components of the hinge 810 as well as conceal the inner components of the hinge 810 from the view of a user. The links 820, 822 can be attached to one another or the intermediate component 842, proximal portion 806, distal portion 808, or other components via a myriad of methods. The methods of attachment can include laser welds, sheet metal snaps, screw bosses, and other methods not mentioned herein.

Any of the features, components, and/or parts, including the arrangements and configurations thereof shown in FIGS.

8A and 8B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 8A and 8B. Other example configurations of hinges for use in a head-mountable device are given in reference to FIG. 9 below.

Figure 9:
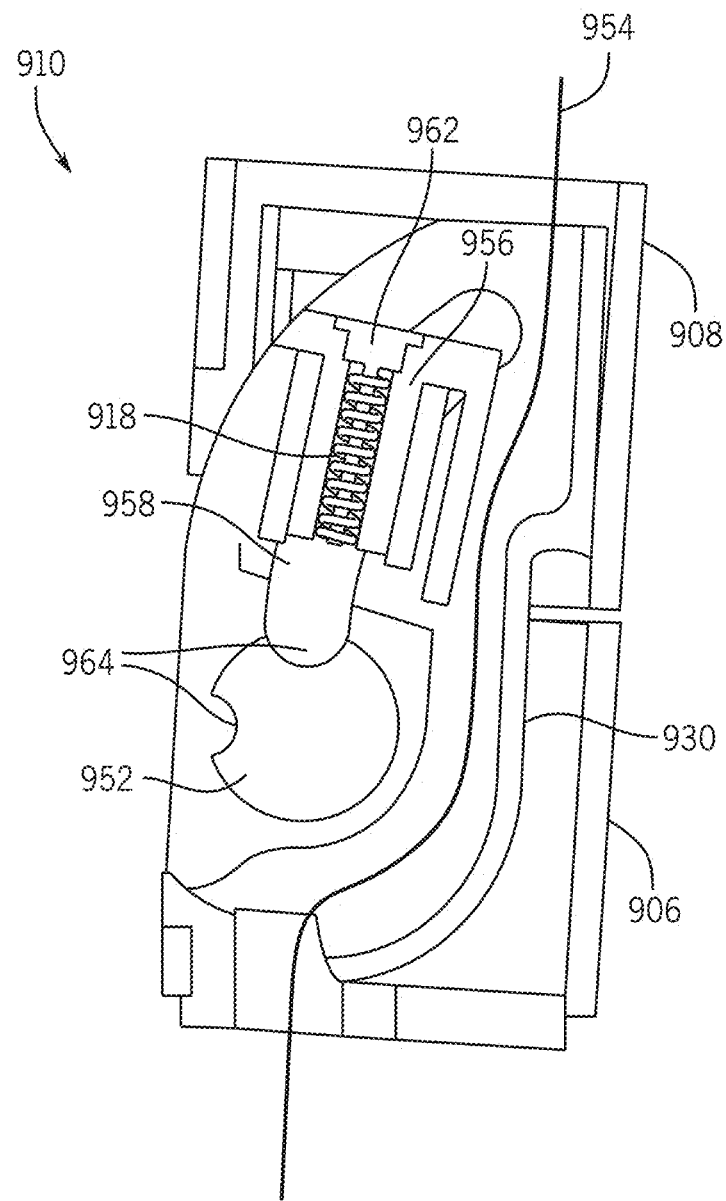
FIG. 9 shows a cross-sectional view of another example hinge of a head-mountable device in a first state.

FIG. 9 shows a cross-sectional view of another example hinge 910 of a head-mountable device in a first state, including a proximal portion 906, a distal portion 908, a rotatable member 952, a sliding member 958, a piston 962, and one or more springs 918. In some embodiments, the distal portion 908 can include a cover 930 and an insert 956. The insert 956 can be configured to retain the one or more springs 918. In some embodiments, the insert 956 can perform a sliding function to compress the one or more springs 918. The proximal portion 906 can be configured to receive the cover 930 when the hinge 910 is in the open position. In the open position, the cover 930 can protect the inner workings of the hinge 910 while hiding the hinge 910 from the view of a user.

In some embodiments, several components of the hinge 910 can be disposed within the distal portion 908 and can rotate with the distal portion 908 when moving from the open position to the folded position or vice versa. For example, the sliding member 958, the piston 962, and the one or more springs 918 can be disposed within, and can rotate with, the distal portion 908. By including one or more hinge components within the distal portion 908, the proximal portion 906 can be made smaller (or have a thinner profile). In these or other examples, the proximal portion 906 is closer to the display of the head-mountable device, and a smaller proximal portion 906 can facilitate the space for improved and/or larger projectors, better projections for increased field of view or image resolution/quality, a larger display portion, etc. Another potential benefit of disposing hinge components within the distal portion 908 is an increase in available space within the proximal portion 906. The space within the proximal portion can be used to house electronic components such as processors, batteries, electrically conductive cables, projectors, waveguides, or other electronic components not specified herein.

To facilitate this, the rotatable member 952 can be affixed to the proximal portion 906 and can include one or more depressions 964 configured to receive the sliding member 958. The sliding member 958 can be received by one or more depressions 964 in the open position and in the folded position. In the open position and in the folded position, the one or more springs 918 can be either slightly compressed or not compressed. In the transitory state, the sliding member 958 can be displaced from the one or more depressions 964 toward the one or more springs 918. The sliding member 958 can be connected to the piston 962 such that when the sliding member 958 is displaced toward the one or more springs 918, the piston 962 compresses the one or more springs 918. In some examples, the sliding member 958 can be connected to the piston 962 via a static or rotatable method. For example, the sliding member 958 can be connected to the piston via laser weld or press fit. In other examples, the sliding member 958 can be connected to the piston 962 via screw bosses or a pin. In this manner, the one or more springs 918 bias the hinge 910 toward either the open position or the folded position when in the transitory state. This bias, coupled with the stability of the hinge in the open position and the folded position creates the bi-stable nature of the hinge 910.

In the splay position, the insert 956 compresses the one or more springs 918. By compressing the one or more springs 918 in the splay position, the hinge 910 can be biased toward the open position. In the splay position, the angle and rotation of the distal portion 908 can be defined by a curvature in the sliding member 958. The curvature defined by the sliding member 958 can create a virtual pivot point about which the distal portion 908 rotates when entering or exiting the splay position. This can maintain a constant gap between the corners of the proximal portion 906 and the distal portion 908, as discussed in FIG. 6A above.

In some embodiments, electrically conductive cables, flexes, or other electronic components 954 can be routed through the hinge 910. In some examples, the electrically conductive cables, flexes, or other electronic components can be routed from the proximal portion, through a space created between the hinge components 952, 956 and the cover 930, and into the distal portion 908. In some examples, the internal geometry of the hinge 910 can affect the length of the route occupied by the electrically conductive cables, flexes, or other components. For example, the required length for the electrically conductive cables, flexes, or other electronic components to pass through the hinge 910 can be shorter when the hinge 910 is in an open position, and can be longer when the hinge 910 is in a closed position. The difference in length can range from 0 mm to 2 mm, from 2 mm to 4 mm, from 4 mm to 6 mm, or more.

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9. The following section describes another example of a hinge configuration, including arm housings.

Figure 10A:
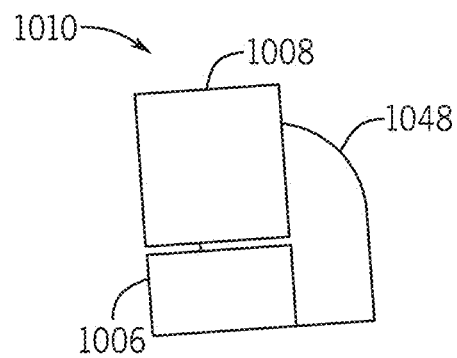
FIG. 10A shows a top view of another example hinge of a head-mountable device in a first state.

FIG. 10A shows a top view of another example hinge 1010 of a head-mountable device in an open position, including a proximal portion 1006, a distal portion 1008, and a protrusion 1048. In some examples, the protrusion 1048 can house components of the hinge 1010. In other embodiments, the protrusion 1048 can house electrical components, such as a projector, speaker, processor, battery, or memory component. In yet other embodiments, the protrusion 1048 can house a combination of hinge and electrical components. The protrusion 1048 can provide space for hinge or electrical components while maintaining an aesthetically pleasing exterior.

Figure 10B:
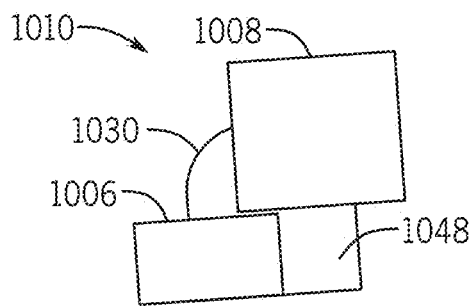
FIG. 10B shows a top view of another example hinge of a head-mountable device in a second state.

FIG. 10B shows a top view of another example hinge of a head-mountable device in a folded position, including a proximal portion 1006, a distal portion 1008, and a protrusion 1048. The protrusion 1048 can also include a cover 1030 that protects the hinge and electrical components housed by the protrusion 1048. The cover 1030 can also serve to conceal hinge or electrical components from the view of a user.

Any of the features, components, and/or parts, including the arrangements and configurations thereof shown in FIGS. 10A and 10B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 10A and 10B. The following section shows the inner workings of the arms and cover portions of a hinge for a head-mountable device.

Figure 11:
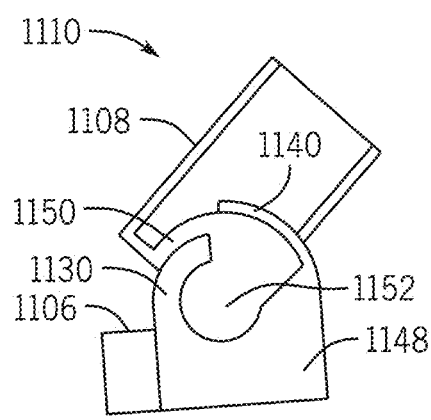
FIG. 11 shows a cross-sectional view of an example hinge of a head-mountable device in a transitory state.

FIG. 11 shows a cross-sectional view of the hinge shown in FIG. 10A and FIG. 10B. The hinge 1110 is shown in a transitory state, including a proximal portion 1106, a distal portion 1108, and a protrusion 1148. The distal portion 1108 can include a curved arm 1150 attached to a rotatable member 1152. In some embodiments, the hinge 1110 can rotate about the rotatable member 1152. The protrusion 1148 can include a cover portion 1130 and a flange portion 1140. In some examples, the cover portion 1130 and the flange portion 1140 can be configured to receive the curved arm 1150 such that the inner components of the hinge 1110 are concealed at all points along the range of motion of the hinge 1110. The cover portion 1130 and the flange portion 1140 can function together as a sleeve, retaining the curved arm 1150. In the transitory state, the cover portion 1130 can form an empty space with the rotatable member 1152, allowing the distal portion 1108 to return to an open position.

The cover portion 1130, flange portion 1140, and curved arm 1150 are configured to facilitate hinge with minimal visible parting lines and ports. As used herein, the term "parting line" refers to the line created when one part abuts another part, especially in a slidable interface. For example, multiple sliding parts or multiple sides of a sliding part can create more parting lines, which can detract from the aesthetic properties of the hinge. A higher number of parting lines can also increase possible points of failure through stress concentration, manufacturing defects, or other causes. The term "port" as used herein refers to an opening in a part, specifically configured to receive another part in at least one position. For example, the opening defined by the cover portion 1130 and the flange portion 1140 can define a port configured to receive the curved arm 150. The hinge 1110 is configured such that the port defined by the cover portion 1130 and the flange portion 1140 is not visible from the exterior of the hinge.

In some embodiments, the rotatable member 1152 can be affixed to the curved arm 1150 via one or more fasteners, adhesive materials, or other methods of attachment. In some embodiments, the rotatable member can be accessed through the protrusion 1148 and affixed to the curved arm 1150 via a screw. In some examples, electrically conductive cables, flexes, or other electronic components can be routed through the hinge 1110. For example, an electrically conductive cable or flex can be routed from the protrusion 1148, along a portion of the rotatable member 1152, and onto the inner portion of the curved arm 1150. The electrically conductive cable or flex can then pass through an opening (not shown) in the curved arm 1150 and extend in to the distal portion 1108. In some embodiments, the electrically conductive cable or flex can be attached to one or more components of the hinge 1110, including but not limited to the curved arm 1150 and the rotatable member 1152. The electrically conductive cable or flex can be attached via a temperature sensitive adhesive (TSA) or a pressure sensitive adhesive. In some examples, the internal geometry of the hinge 1110 can affect the length of the route occupied by the electrically conductive cables, flexes, or other components as discussed in FIG. 9 above.

Any of the features, components, and/or parts, including the arrangements and configurations thereof shown in FIG. 11 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 11. The following section refers to the internal workings, components, and attachments of the head-mountable device described in FIG. 11.

Figure 12:
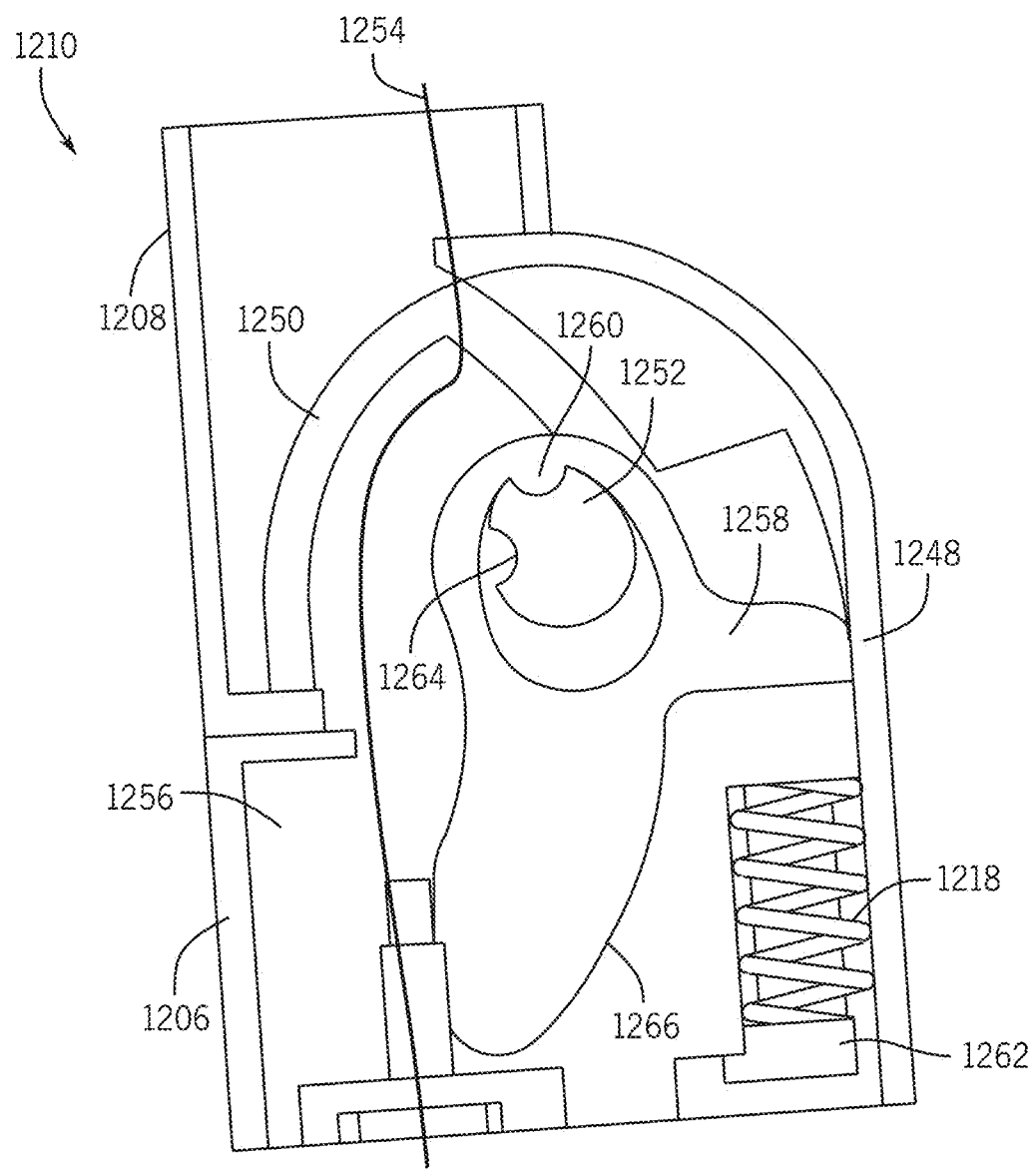
FIG. 12 shows a cross-sectional view of another example hinge of a head-mountable device in a first state.

FIG. 12 shows a cross-sectional view of another example hinge 1210 of a head-mountable device in an open position, including a proximal portion 1206 and a distal portion 1208. The proximal portion 1206 can include a protrusion 1248 that defines one side of the proximal portion 1206. The distal portion 1208 can include a curved arm 1250 and a rotatable member 1252. The hinge 1210 can also include an insert 1256 disposed within the internal volume defined by the proximal portion 1206. The insert 1256 can substantially fill the internal volume defined by the proximal portion 1206 and can be secured to the proximal portion 1206 via fasteners, adhesives, or other methods not listed herein. The insert 1256 can be configured to receive a sliding member 1258. The rotatable member 1252 can be at least partially disposed within an opening in the sliding member 1258. The sliding member 1258 can also include a lobe 1260 that is received by one or more depressions 1264 in the rotatable member 1252, preventing the rotatable member 1252 from rotating without the application of an external force such as a user opening or folding the hinge 1210. The sliding member 1258 can also be attached to one or more springs 1218 via one or more pistons 1262.

As the distal portion 1208 is rotated toward the folded position, the rotatable member 1252 forces the lobe 1260 of the sliding member 1258 out of a depression 1264 in the rotatable member 1252, therefore disposing the sliding member 1258 toward the distal portion 1208. The disposition of the sliding member 1258 toward the distal portion 1208 can be referred to as the raised position. In the raised position the sliding member 1258 pulls the one or more pistons 1262 toward the distal portion 1208, compressing the one or more springs 1218. The resistance of the springs 1218 provides a biasing force that facilitates the bi-stable nature of the hinge 1210. As the distal portion 1208 nears the folded position, the lobe 1260 is received by a depression 1264 in the rotatable member 1252. This allows the sliding member 1258 to exit the raised position and allows the one or more springs 1218 to decompress via the piston 1262. In this way, each depression 1264 in the rotatable member 1252 corresponds with a stable position of the hinge 1210.

When the distal portion 1208 is in the splay position, the rotatable member 1252 pulls the sliding member 1258 away from the proximal portion 1206. This compresses the one or more springs 1218 via the one or more pistons 1262, disposing the hinge 1210 toward the stable, open position. The insert 1256 constrains the motion of the sliding member 1258 to an arc defined by a cutout in the insert 1256. The arced path of the sliding member 1258 creates a virtual pivot point outside the interior volume defined by the proximal portion 1206 and the distal portion 1208. This can maintain a constant gap between the corners of the proximal portion 1206 and the distal portion 1208 as discussed in FIG. 6A above. In some embodiments, the protrusion 1248 can include a cutout 1266 that limits the travel of the sliding member 1258. This can prevent the distal portion 1208 from separating from the proximal portion 1206. In this manner, the cutout 1266 can prevent the hinge 1210 from becoming damaged or broken. When the distal portion 1208 returns to the open position, the sliding member 1258 is received by the insert 1256, allowing the one or more springs to decompress via the one or more pistons 1262.

In some embodiments, the sliding member 1258 can be connected to one spring 1218. In other embodiments, the sliding member 1258 can be connected to multiple springs, such as three springs 1218. In some embodiments, the one or more springs 1218 can be axially disposed within the protrusion 1248. The use of three springs 1218 can allow each spring 1218 to exert less force, which facilitates the use of smaller springs 1218. By using smaller springs (e.g., of a smaller diameter) the moment arm can be lengthened, which further reduces the amount of force and therefore size required from each spring 1218. This can create a more compact mechanism, which can increase usable space within the proximal portion 1206. A smaller mechanism can also facilitate a smaller overall product by shrinking the minimum size of the proximal portion 1206.

The hinge 1210 can also include an electronic circuitry component 1254. In some embodiments, the electronic circuitry component 1254 can be one or more electrically conductive wires or flexes. The electronic circuitry component 1254 can be routed through the hinge 1210. In some examples, the electronic circuitry component 1254 can be routed through the insert 1256, along the inner side of the curved arm 1250 and into the distal portion 1208 through the opening between the curved arm 1250 and the flange portion 1240. In some embodiments, the electrically conductive cable or flex can be attached to one or more components of the hinge 1210, including but not limited to the curved arm 1250 and the insert 1256. In some examples, the electrically conductive cable or flex can be attached via a TSA or pressure sensitive adhesive. The internal geometry of the hinge 1210 can affect the length of the route occupied by the electrically conductive cables, flexes, or other components. For example, the required length for the electrically conductive cables, flexes, or other electronic components to pass through the hinge 1210 can be shorter when the hinge 1210 is in an open position and can be longer when the hinge 1210 is in a closed position. The difference in length can range from 0 mm to 2 mm, 2 mm to 4 mm, 4 mm to 6 mm, or more.

Any of the features, components, and/or parts, including the arrangements and configurations thereof shown in FIG. 12 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 12. The following section describes another example of the inner workings, components, and attachments of the hinge described in FIG. 11.

Figure 13:
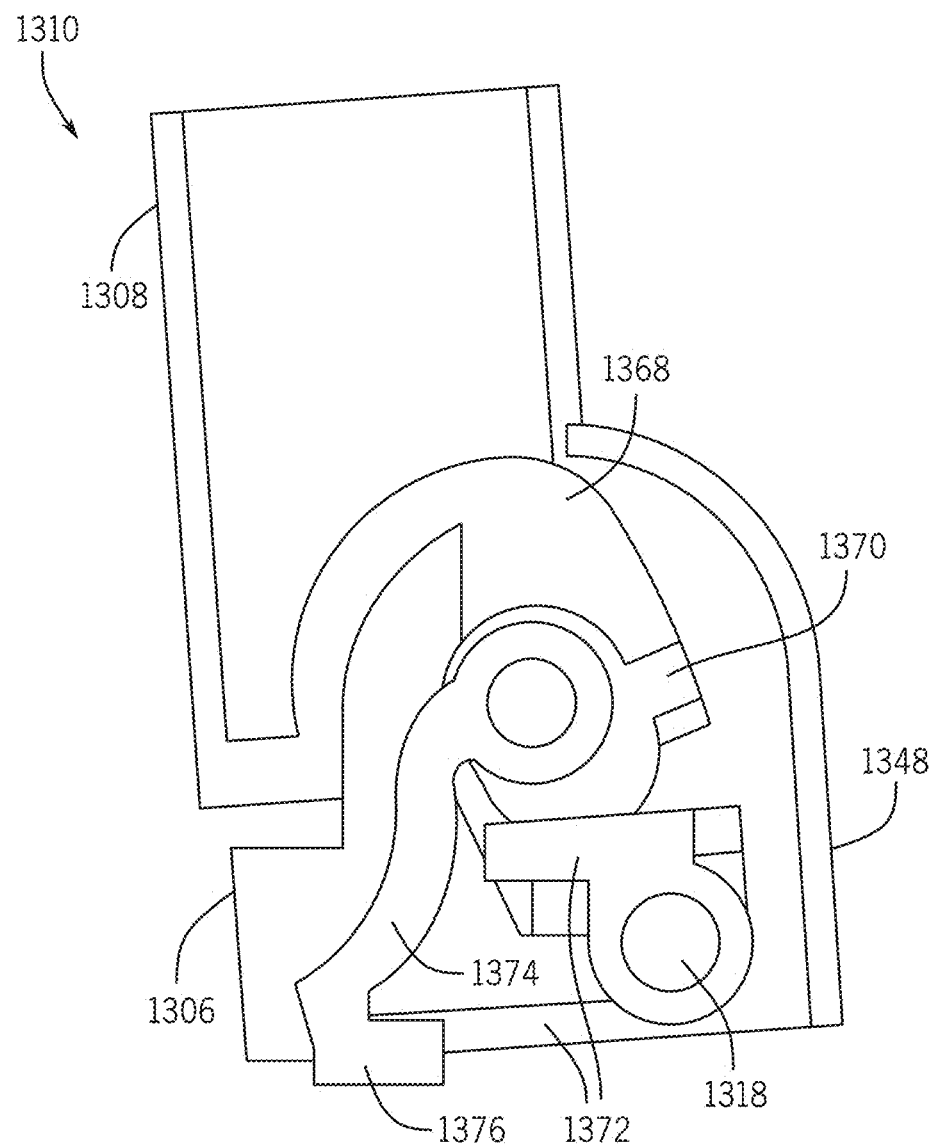
FIG. 13 shows a cross-sectional view of yet another example hinge of a head-mountable device in a first state.

FIG. 13 shows a cross-sectional view of yet another example hinge 1310 of a head-mountable device in a first state, including a proximal portion 1306 and a distal portion 1308. The proximal portion 1306 can include a protrusion 1348 that defines one side of the proximal portion 1306. The distal portion 1308 can include a curved arm 1350 and a shank 1368. In some embodiments, the shank 1368 can be attached to a cam 1370. The proximal portion 1306 can include one or more torsional springs 1318, each having a pair of legs 1372. In different embodiments, the legs 1372 can be at different angles relative to one another. For example, the legs 1372 can be at an angle of approximately 90 degrees, approximately 180 degrees, approximately 270 degrees, approximately 360 degrees, or any other angle not mentioned herein. The proximal portion 1306 can also include a translating arm 1374. In some embodiments, the translating arm 1374 can include a catch 1376. The catch 1376 can be configured to receive one or more legs 1372 of the one or more torsional springs 1318.

In some examples, the shank 1368 rotates the cam 1370 when transitioning from the open position to the folded position of vice versa. The cam 1370 can be connected to the translating arm 1374 in such a way that the cam 1370 can rotate without displacing the translating arm 1374. This can be accomplished via a shared pin or other method of attachment. When in the open or folded states, the one or more torsional springs can exert little to no force on the cam 1370, facilitating two stable positions. In a transitory position between the open and folded states, the cam 1370 can displace one or more legs 1372 of the one or more torsional springs 1318. In some embodiments, the leg or legs 1372 displaced can be those closer to the distal portion 1308. This can produce a force that biases the hinge 1310 toward one of the open or folded positions, producing a bi-stable hinge.

In the splay position, the shank 1368 can displace the cam 1370 and the translating arm 1374 away from the proximal portion 1306 on a curve defined by the translating arm 1374. In some embodiments, the translating arm 1374 can in turn displace one or more legs 1372 of the one or more torsional springs 1318, biasing the hinge 1310 toward the open position. In this manner, the splay functionality and the bi-stable nature of the hinge 1310 can be accomplished by one or more torsional springs 1318. The geometry of the cam 1370 and the translating arm 1374 can create a virtual pivot point about which the distal portion 1308 rotates when entering or exiting the splay position. This can maintain a constant gap between the corners of the proximal portion 1306 and the distal portion 1308, as discussed in relation to FIG. 6A above. The use of one spring or set of springs 1318 to accomplish multiple functionalities can reduce the overall size of the hinge 1310, allowing smaller housings or increased space for electrical components. Reducing the number of parts to accomplish multiple functionalities can also simplify and shorten manufacturing, thereby decreasing costs.

Any of the features, components, and/or parts, including the arrangements and configurations thereof shown in FIG. 13 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 13. The following description discusses an example spring, including a spring that can be preloaded to achieve a more sleek or reduced form factor.

Figure 14:
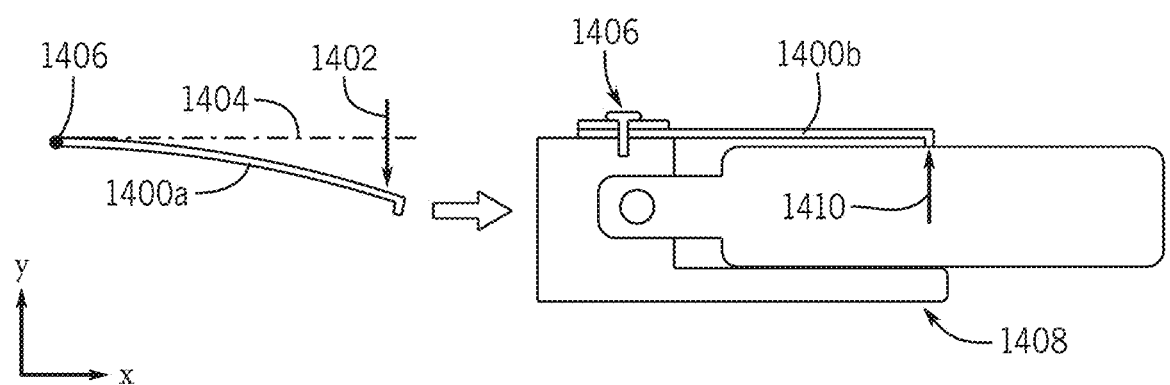
FIG. 14 shows a schematic view of an example spring under preload and a hinge assembly load.

FIG. 14 shows a schematic view of an example spring under preload and a hinge assembly load in accordance with one or more examples of the present disclosure. In these or other examples, a spring can include a variety of different types of springs. In certain examples, a spring can include a sheet metal spring. Additionally or alternatively, a spring can include a sheet of another material, such as plastic, elastomer, composite, etc. In specific implementations, a spring can include a combination of materials (e.g., to provide a particular combination of material properties). In other examples, a spring can include a leaf spring, a compression spring, an extension spring, a helical spring, a machined spring, a disk spring, a torsion spring, a variable-rate spring, a serpentine spring, etc.

As depicted, a spring 1400a (having a sheet form factor) can be cantilevered from a location 1406 and a preload 1402 applied at an opposing end portion of the spring opposite the location 1406. In some examples, the preload 1402 can include a predetermined preload. In particular examples, the preload 1402 is dependent on the induced curvature or bend in the spring 1400a relative to a horizontal reference plane 1404. For instance, in at least some examples, the preload 1402 corresponds to a specific curvature of the spring 1400a that follows a predetermined equation. In a specific example, the preload 1402 corresponds to a specific curvature of the spring 1400a according to the following example expression or line equation:

$$y = \frac{Px^2}{6EI}(3l - x),$$

where the term y refers to the y-coordinate value of the spring curvature line perpendicular to the horizontal reference plane 1404; the term x refers to the x-value of the spring curvature line; the term l refers to the length of the spring from the location 1406 to an opposing end of the spring 1400a; the term E refers to a modulus of elasticity for the spring 1400a; and the term/refers to the area moment of inertia of the cross-section of the spring 1400a.

In some examples, the preload 1402 provides a continuous curvature extending across the spring 1400a. In some examples, the preload 1402 can provide linear portions (e.g., straight portions without curvature) along the spring 1400a. Additionally or alternatively, the preload 1402 can be based on a cantilever beam bending calculation, a stress-strain mapping (e.g., a numerical simulation, such as a finite element analysis), etc.

In these or other examples, the spring 1400a can be bent, shaped, or otherwise plastically deformed such that the spring 1400a maintains a predetermined curvature upon removal of the preload 1402. Thus, when the spring 1400a transitions to an assembled state, shown as a spring 1400b, the spring 1400b can include another predetermined shape or form factor. For example, a hinge assembly 1408 can impart an assembly load 1410 upon the spring 1400b. The assembly load 1410 is approximately in the opposite direction as the preload 1402. That is, when assembled in conjunction with the hinge assembly 1408, the spring 1400b can be biased in a direction opposite the preload 1402. In some examples, the spring 1400b can be biased from the assembly load 1410 so as to be shaped or aligned with one or more portions of the hinge assembly 1408. For example, the spring 1400b can be made flat or parallel with the hinge assembly 1408 and/or the horizontal reference plane 1404. In certain examples, the spring 1400b includes no humps or non-flat portions that are artifacts from the preloaded curvature. Accordingly, the spring 1400b can include a slimmer profile for increased efficiency of space usage (while also avoiding interference/tolerance issues).

Any of the features, components, and/or parts, including the arrangements and configurations thereof shown in FIG. 14 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 14.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A head-mountable electronic device, comprising:
    a frame;
    a display window secured to the frame;
    an arm;
    a bi-stable hinge connecting the arm to the frame, the bi-stable hinge and the arm defining a folding direction of rotation and a splay direction of rotation opposite the folding direction of rotation;
    a first electronic component positionally fixed between the display window and the bi-stable hinge;
    a second electronic component positioned distal to the bi-stable hinge; and
    a cable connecting the first electronic component and the second electronic component through the bi-stable hinge.

2. The head-mountable electronic device of claim 1, wherein the bi-stable hinge comprises a 4-bar linkage.

3. The head-mountable electronic device of claim 1, wherein the bi-stable hinge comprises a first pivot point and defines a second pivot point, the second pivot point comprising a virtual pivot point.

4. The head-mountable electronic device of claim 1, wherein the bi-stable hinge comprises a cover that conceals components of the bi-stable hinge during rotation of the arm from the open position to the folded position.

5. The head-mountable electronic device of claim 1, wherein the first electronic component comprises a projector.

6. The head-mountable electronic device of claim 5, wherein the arm further defines a lateral protrusion, the projector disposed within the lateral protrusion.

7. The head-mountable electronic device of claim 1, wherein the second electronic component comprises at least one of a battery or a printed circuit board.

8. A hinge assembly for electronic glasses, the hinge assembly comprising:
    a distal end connectable with an arm;
    a proximal end connectable with a frame;
    a first pivot point positioned inside the hinge assembly between the distal end and the proximal end, the first pivot point having a folding direction of rotation; and
    a second pivot point positioned exterior to the hinge assembly, the second pivot point having a splay direction of rotation opposite the first direction of rotation.

9. The hinge assembly of claim 8, wherein the second pivot point is a virtual pivot point formed at an outer gap opening defined by exterior surfaces of the arm and the frame.

10. The hinge assembly of claim 9, wherein the outer gap opening maintains a constant size during rotation of the hinge assembly in the splay direction of rotation.

11. A wearable apparatus, comprising:
    a housing;
    a viewing window secured to the housing;
    a foldable arm connected to the housing; and
    a joint connecting the foldable arm and the housing, the joint comprising:
        a spring positioned axial with the foldable arm;
            a connecting link comprising a first end and a second end, the first end connected to the spring, and the first end of the connecting link includes a hook attachable to the spring;
            a rotating link comprising a third end and a fourth end, the third end comprising a pivot point for the rotating link, and the fourth end being connected to the second end; and
            a follower in contact with the rotating link.

12. The wearable apparatus of claim 11, further comprising a cable routed through the joint.

13. The wearable apparatus of claim 12, wherein the cable is routed through the connecting link.

14. The wearable apparatus of claim 11, wherein:
the foldable arm is movable between 80 and 100 degrees in a first direction; and
the foldable arm is movable between 5 degrees and 15 degrees in a second direction opposite the first direction.

15. The wearable apparatus of claim 11, wherein:
the spring compresses during a first portion of a folding cycle of the foldable arm; and
the spring decompresses during a second portion of the folding cycle.

16. The wearable apparatus of claim 11, wherein an internal portion of at least one of the housing or the foldable arm is exposed prior to connecting the first end of the connecting link to the spring.

17. The wearable apparatus of claim 11, wherein the follower is translatable along a surface of the rotating link between the third end and the fourth end.

* * * * *